(12) United States Patent
Golds et al.

(10) Patent No.: US 7,150,018 B2
(45) Date of Patent: Dec. 12, 2006

(54) METHOD AND SYSTEM FOR DETERMINISTIC ORDERING OF SOFTWARE MODULES

(75) Inventors: David P. Golds, Redmond, WA (US); Keith S. Kaplan, Bothell, WA (US); Eileen C. Brown, Seattle, WA (US); Neal Christiansen, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 386 days.

(21) Appl. No.: 09/768,098

(22) Filed: Jan. 23, 2001

(65) Prior Publication Data

US 2001/0020245 A1    Sep. 6, 2001

Related U.S. Application Data

(63) Continuation-in-part of application No. 09/505,344, filed on Feb. 16, 2000, now Pat. No. 6,647,473.

(51) Int. Cl.
*G06F 9/40* (2006.01)
*G06F 9/44* (2006.01)
*G06F 9/46* (2006.01)

(52) U.S. Cl. .................... 718/102; 718/100; 718/107; 718/103

(58) Field of Classification Search ........ 719/310–332; 718/100–108, 1
See application file for complete search history.

(56) References Cited

U.S. PATENT DOCUMENTS

| 5,140,237 | A | * | 8/1992 | Sasaki et al. | .......... 318/568.11 |
| 5,175,849 | A | | 12/1992 | Schneider | |
| 5,403,639 | A | | 4/1995 | Belsan et al. | |
| 5,761,522 | A | * | 6/1998 | Hisanaga et al. | .............. 712/1 |
| 5,761,526 | A | | 6/1998 | Sakakura et al. | |
| 5,819,292 | A | | 10/1998 | Hitz et al. | |
| 5,870,756 | A | * | 2/1999 | Nakata et al. | .............. 707/200 |
| 5,915,264 | A | | 6/1999 | White et al. | |
| 5,931,935 | A | * | 8/1999 | Cabrera et al. | ............. 710/260 |
| 5,956,713 | A | | 9/1999 | Bamford et al. | |

(Continued)

FOREIGN PATENT DOCUMENTS

JP     01088835 A   *  4/1989

(Continued)

OTHER PUBLICATIONS

Decasper, Dan et al. "Router Plugins, A Software Architecture for Next Generation Routers." ACM. 1998, pp. 229-240.*

(Continued)

*Primary Examiner*—Lewis A. Bullock, Jr.
(74) *Attorney, Agent, or Firm*—Workman Nydegger (57) ABSTRACT

A method and system for ordering software modules in a guaranteed order for execution. Unique values are statically assigned to software modules (e.g., filter drivers) when fully developed. Each module's assigned value determines its relative position to other modules in a stack or other arrangement, fixing the execution order for any set of filter drivers. Static values may comprise floating-point numbers, whereby each new software module may be assigned a number that enables positioning it between any two existing software modules. For example, filter drivers may be generally classified and assigned values in a range according to type. Drivers of the same type may be ordered within their general range to guarantee one possible ordering. A filter manager architecture is described, in which filter drivers register with a manager for relevant file system I/O operations. The manager calls appropriately registered filter drivers in an order based on their assigned numbers.

25 Claims, 6 Drawing Sheets

U.S. PATENT DOCUMENTS

| | | | |
|---|---|---|---|
| 5,963,959 A | 10/1999 | Sun et al. | |
| 5,978,815 A * | 11/1999 | Cabrera et al. | 707/204 |
| 6,023,744 A | 2/2000 | Shoroff et al. | |
| 6,038,639 A | 3/2000 | O'Brien et al. | |
| 6,105,030 A | 8/2000 | Syed et al. | |
| 6,148,336 A * | 11/2000 | Thomas et al. | 709/224 |
| 6,163,793 A * | 12/2000 | Gerber et al. | 718/103 |
| 6,289,335 B1 | 9/2001 | Downing et al. | |
| 6,289,356 B1 | 9/2001 | Hitz et al. | |
| 6,292,941 B1 * | 9/2001 | Jollands | 717/176 |
| 6,341,341 B1 | 1/2002 | Grummon et al. | |
| 6,377,939 B1 * | 4/2002 | Young | 705/34 |
| 6,560,606 B1 * | 5/2003 | Young | 707/100 |
| 6,629,315 B1 * | 9/2003 | Naylor | 717/168 |
| 6,782,531 B1 * | 8/2004 | Young | 717/130 |
| 2003/0100958 A1 * | 5/2003 | Cachat et al. | 700/18 |

FOREIGN PATENT DOCUMENTS

| | | | | |
|---|---|---|---|---|
| JP | 03113642 | A | * | 5/1991 |
| JP | 04100104 | A | * | 4/1992 |
| JP | 11327928 | A | * | 11/1999 |
| JP | 2000137603 | A | * | 5/2000 |
| JP | 2001100807 | A | * | 4/2001 |

OTHER PUBLICATIONS

Anonymous, Copy of International Search Report in Corresponding EP Application No. EP 02 00 1445.

Netscape Communications Corporation: "Composer Plug-In Guide, Chapter 9: Event Handler Plug-Ins." Sep. 1997. pp. 133-140.

Nagar, Sanjeev. "Windows NT File System Internals: A Developer's Guide." Sep. 1997.

* cited by examiner

METHOD AND SYSTEM FOR DETERMINISTIC ORDERING OF SOFTWARE MODULES

CROSS-REFERENCE TO RELATED APPLICATION

The present invention is a continuation-in-part of U.S. patent application Ser. No. 09/505,344, filed Feb. 16, 2000, now U.S. Pat. No. 6,647,473.

FIELD OF THE INVENTION

The present invention relates generally to computer systems, and more particularly to installable software modules in a computer system such as file system filter drivers.

BACKGROUND OF THE INVENTION

Software modules such as file system filter drivers may be stacked or otherwise arranged linearly (e.g., chained), and perform their operations in the order in which they are stacked. For example, in the Windows® 2000 operating system, file system filter drivers are stacked into a driver stack where they are able to intercept file system-directed requests and responses to and from a base file system (such as FAT or NTFS). In this manner, the drivers can do things such as scan file data for viruses, enforce disk usage quotas, encrypt data, and perform other similar functions.

While it is often useful to run more than one such filter driver for each file storage volume of a computer system, these filters are written by a number of vendors, and software bugs often result because of interoperability issues between the various filters. Testing has discovered that these bugs sometimes depend on the order in which drivers are loaded and attach in the filter driver stack. At the same time, there are also certain combinations of filters that by their very nature can only work properly when attached in a certain order. For example, to be effective, an antivirus filter (that reads the contents of a file to look for viruses) needs to see the data before the data is scrambled by an encryption filter.

At present, however, file system filter drivers and other similar software modules are not loaded in any particular order, leading to potential problems. Instead, the actual load order depends on a combination of hints provided to a computer administrator/user, as well as variables such as the file system on the boot volume, and even the alphabetical order of the file system names of other installed drivers. Moreover, there is no guarantee that drivers attach in a particular order even if they are loaded in a particular order. As a result, many combinations of drivers need to be tested, to ensure their correct operation in normal usage.

SUMMARY OF THE INVENTION

Briefly, the present invention provides a method and system for ordering software modules in a guaranteed order. To this end, the present invention provides a mechanism whereby unique values are statically assigned to software modules at the time that each of the software modules (e.g., filter drivers) are developed. Each module's assigned value determines its position relative to other modules in a stack. In this manner, the order for any given set of filter drivers is fixed, eliminating bugs and other problems that result from alternative orderings, and also significantly simplifying testing. A single administrative entity, e.g., the vendor of the operating system on which the drivers will be run or some independent verification authority, can assign the numbers to third-party vendors who wish to write drivers that comply with the operating system's various reliability requirements.

In one implementation, this static value (sometimes referred to as an "altitude" because stacks are typically represented vertically) comprises an arbitrary precision floating-point number. As a result, as new software modules are developed, each such module may be assigned a number that will enable that software module to be positioned between any two existing software modules, since between any two real numbers there exists an infinite number of other real numbers. By way of example, if altitudes such as 0.1 and 0.2 are assigned to filter drivers A and C, if some filter driver B is developed that needs to be attached between A and C, there will an unused altitude available between A and C that can be assigned to B, e.g., 0.15. If some other filter needed to attach between B and C, there will always be an unused altitude between B and C (e.g., 0.18) that is available.

When applied to filter drivers, the drivers will be generally classified according to their type, e.g., (antivirus, quota, encryption), as it is already known where such classes should approximately attach. For example, if altitudes are assigned values in the range from 0.0 to 1.0, where higher values attach closer to the base file system (e.g., NTFS), antivirus products may all get an altitude in 0.2 to 0.3 range, quota drivers between 0.4 and 0.6, and encryption filters go between 0.7 and 0.8. Moreover, drivers of the same type are also ordered among one another within their general range, which guarantees only one possible ordering in both testing and actual operation. In one described embodiment, the invention is practiced in a filter manager architecture, in which instead of attaching in a conventional stack, filter drivers will register with a manager for I/O volume operations in which they are interested. The manager will then call appropriately registered filter drivers in an order based on their assigned numbers to pass the I/O requests thereto.

Other advantages will become apparent from the following detailed description when taken in conjunction with the drawings, in which:

DETAILED DESCRIPTION

Exemplary Operating Environment

Figure 1:
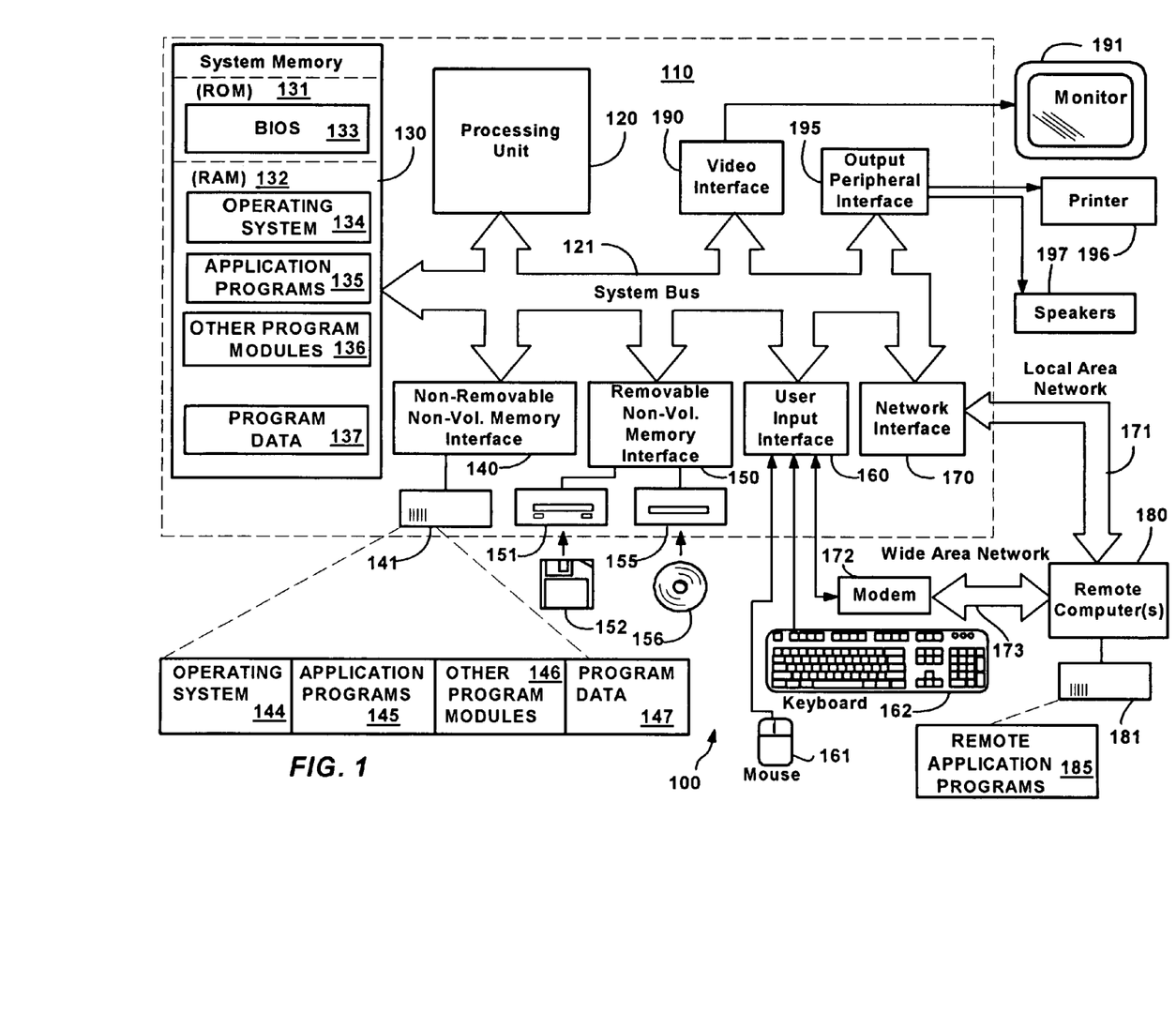
FIG. 1 is a block diagram representing an exemplary computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Ordered Software Modules

The present invention is primarily described herein with reference to filter drivers in a filter driver stack, and in a Windows® 2000 environment. Notwithstanding, there is no intention to limit the present invention to filter drivers or any particular environment or operating system, but rather it can be readily appreciated that other types of software modules may benefit from the present invention, and that the present invention is not limited to any particular environment.

Figure 2:
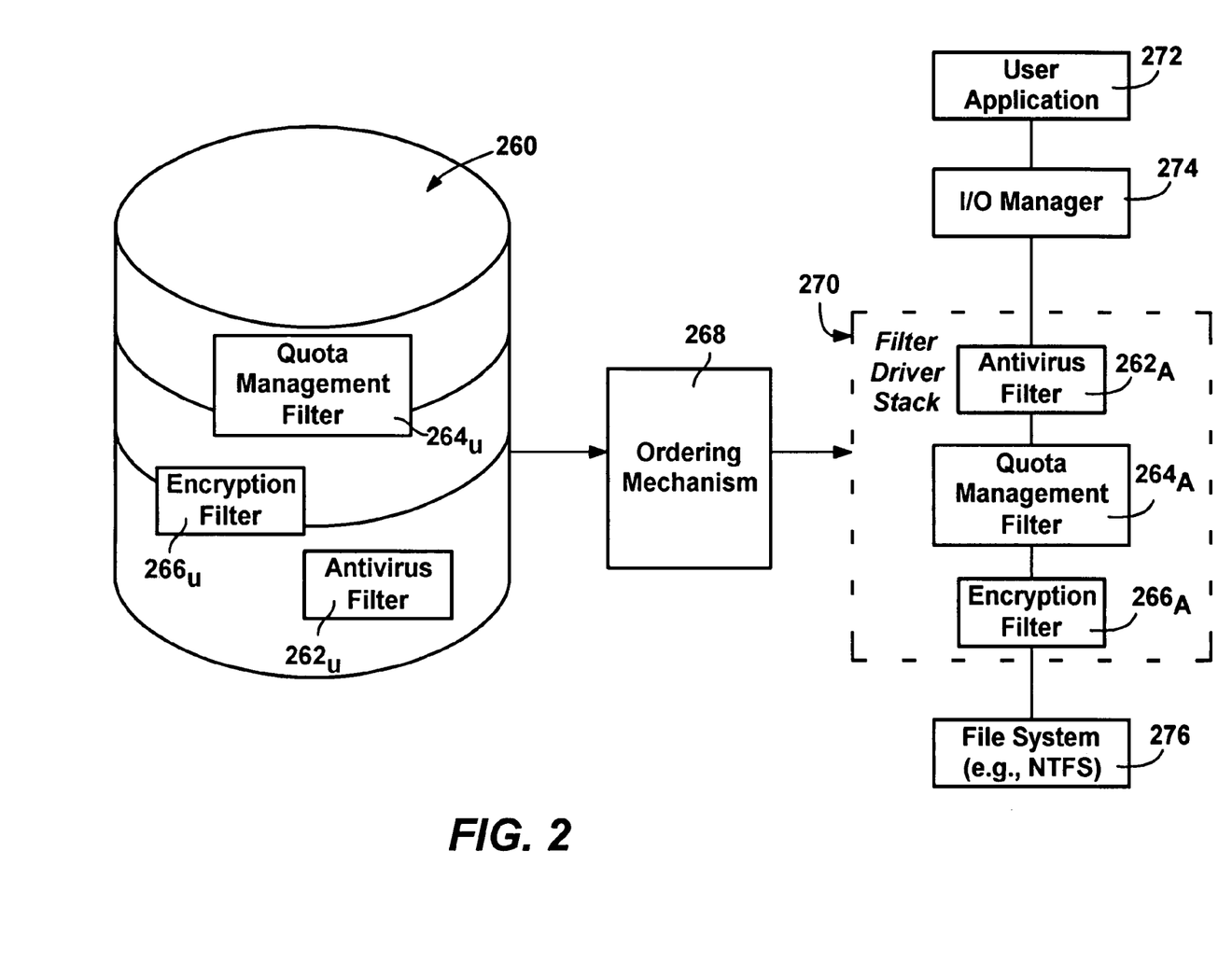
FIG. 2 is a block diagram representing how filter drivers are ordered in accordance with one aspect of the present invention when loaded into a filter driver stack.

Turning to FIG. 2 of the drawings, there is represented one general concept of the present invention, wherein a set of installable software modules are available to a computing system (such as the computer 110) in a data store 260. As described below, such software modules may comprise file system filter drivers, including an antivirus filter $262_u$, a quota management filter $264_u$ and an encryption filter $266_u$, (wherein the subscript "u" represents the unattached state of the drivers). Many other types of drivers are feasible, including those that are available in the data store 260 but not necessarily loaded in a particular configuration. The functionality performed by such drivers is well known, and is thus not described in detail herein except to generally note that there may be an attachment order that is necessary for proper operation. For example, when the drivers are attached together in a stack, the encryption filter $266_u$ cannot encrypt the data on the way to the file system before the antivirus filter $262_u$ sees it, otherwise the antivirus filter $262_u$ will be unable to scan the file data for patterns indicative of a virus.

In accordance with one aspect of the present invention, there is provided an ordering mechanism 268 that loads, attaches and/or otherwise arranges filter drivers (e.g., $262_A$, $264_A$ and $266_A$) in a proper and consistently repeatable order in a filter driver stack 270, wherein the subscript "A" indicates the attached (and loaded) state of the drivers. One such ordering mechanism 268 may be run at boot time as part of driver loading to ensure the correct attachment order. Alternatively, an improved model for filter drivers that allows the loading and unloading of filter drivers at any time, along with a more selective use of drivers in an order according to the present invention, is described below with reference to FIGS. 3 and 4.

As generally known and as represented in FIG. 2, a user-level application 272 or the like sends file system requests such as via API calls to an input-output (I/O) manager 274 of the operating system 134. One of the functions of the I/O manager 274 is to send the file system requests to the file system 276 via the filter driver stack 270. For example, in the environment described herein, this may be accomplished by sending I/O request packets, or IRPs, to the driver stack 70. As is also known, the drivers can intercept IRPs, and modify, return and/or cancel them. For example, the antivirus filter can analyze the data identified in an IRP, and stop the IRP if a virus is detected before it reaches other drivers or the file system.

In accordance with an aspect of the present invention, each filter (or at least each type of filter) that is to be ordered (e.g., when stacked) may be assigned a unique value that determines its order relative to other drivers. Preferably, various filters that are of the same type are also ordered relative to one another, so that they are stacked or otherwise arranged in a consistently repeatable manner. As can be appreciated, this simplifies testing, since if each driver is given a unique ordering value, there is only one possible permutation regardless of which drivers are present. This helps find and thereby reduce interoperability bugs among drivers. Note that while unique numbers will be used, it is feasible to reassign a number, such as to a replacement driver, with some tie-breaking mechanism used (e.g., the one with the later timestamp replaces the other or goes first) in the event two drivers have the same ordering number.

To assign ordering values to drivers, drivers are generally grouped into classes by their functionality. Within each class, various rules may be employed to assign ordering values to drivers, such as by creation date of the driver, random ordering, alphabetical ordering, and so on, and these rules may vary by class. For example, a recently created antivirus driver is more likely to detect more viruses than an earlier one, and thus if someone wants two such drivers installed simultaneously, it may increase efficiency to put more-recent antivirus drivers where they will see the data first. Similarly, one type of compression may be more efficient if performed before another type, (assuming multiple compression is desirable). In other cases, the assigned altitude within a class will be arbitrary, e.g., there will be combinations where filter A could work above filter B just as well as filter B will work above A. Nevertheless, a one-time decision will be made (perhaps randomly) so that future testing by vendors of drivers A and B, as well as by any third party testing lab, will be done with the same attachment order that actual customers will use.

The following table represents one way in which drivers can be classified based on their general types for ordering purposes in accordance with the present invention:

| LoadOrderGroup | Class Name | Comment |
| --- | --- | --- |
| Top | none | Used as a catch all for drivers going above the standard categories. |
| Activity Monitor | ActivityMonitor | Intercepts and reports on File I/O |
| Undelete | Undelete | Allows any deleted files to be recovered |
| Anti-Virus | AntiVirus | Detects/disinfects viruses during file I/O |
| Replication | Replication | Replicates changes to remote machine |
| Continuous Backup | ContinuousBackup | Replicates changes to backup media |
| Content Screener | ContentScreener | Prevents creation of specific files/content |
| Quota Management | QuotaManagement | Provides enhanced File System Quotas |
| Cluster File System | CFSMetaDataServer | Specifically, a particular and common design: "Served metadata using pairs of filters" |
| Compression | Compression | Compression |
| Encryption | Encryption | Filter that Encrypts/Decrypts File I/O |
| Open File | OpenFileBackup | Provides snapshots of already open files |
| Security Enhancer | SecurityEnhancer | Applies lockdown and enhanced ACLs |
| HSM | HSM | Hierarchical Storage Management |
| Copy protection | CopyProtection | Checks for out-of-band data on media |
| Bottom | none | Used as a catch all for drivers going below the standard categories. |
| System | | Reserved. |

In one preferred embodiment, once classified into a group, each driver is given an ordering value in a range based on its class type that is a floating point value. In general, the order number may take the form of "0.ABBB," where the first character identified by "A" is used to define a general class or family of driver types, (e.g. antivirus drivers, encryption drivers, file system drivers, snapshot drivers, and the like). Although only one character in the order number is shown to define the class, it is understood that two or more alphanumeric characters may be actually used to identify the general classes of driver types. For example, quota management drivers may be numbered between 0.25 and 0.30, while compression drivers may be numbered between 0.45 and 0.50, and so forth. The ordering values are preferably maintained with the driver, but may be maintained externally, e.g., each driver may have a Globally Unique Identifier (GUID) and a table of GUIDs to ordering values may be maintained. Note that while the use of a table would allow for correction, (e.g., if an error is found later whereby one driver should be atop instead of below another, the numbers could be swapped), it is also practical to simply assign another number to a later version of the driver.

The characters "BBBB" in the order number are used to order individual drivers within the general class of driver types. Through the use of a decimal scheme, rather than an integer or whole number scheme, it will be appreciated that a new individual driver may always be ordered between any two existing individual drivers by adding another character to the individual driver portion of the order number. For example, if a new driver must be ordered between existing drivers at 0.76241 and 0.76242, the new driver may be assigned order number 0.762415, which would then load between drivers 0.76241 and 0.76242. As can be appreciated, letters and other characters can be used in addition to or instead of numbers, e.g., an identification system that would result in some value looking like Z5647.t47x can be employed. Moreover, the numbers need not be conventional decimal values, e.g., instead of 0.4537, a numbering scheme such as 4.5.3.7 or 4.53.7 may be used. Indeed, any system can be used, as long as there are relative values within the system that can be used to determine an order. Note that it is also feasible to implement a scheme wherein whole numbers are used but assigned values are placed far enough apart such that in practice there will virtually always be another number available between any two, e.g., halfway. Note that while feasible, this is less desirable, because no matter how large a range is initially chosen, if the set of available numbers is finite, it can run out. Note that this is particularly likely if the available numbers between two drivers are exponentially reduced (e.g., halved) each time a new driver's assigned value is placed (e.g., halfway) between two other values, and because driver development is unpredictable and would likely tend to fill up certain available ranges first.

Knowing that a given set of filters will always attach in the same order makes it much easier for an entity (e.g., a test lab) to certify not only individual filters, but also combinations of filters. For example, with three filters, there is only one order to test, instead of six possible attachment orders each needing to be tested. Note that although a consistent order is normally desirable, the ordering mechanism 268 may be modified (e.g., via some debugging operation) to allow the order to be varied for testing purposes, such as to confirm that two drivers have been given values that incorrectly put one above the other, resulting in a bug. Once tested, a list may be published identifying drivers that work well together, and also those wherein problems have been detected.

Figure 3:
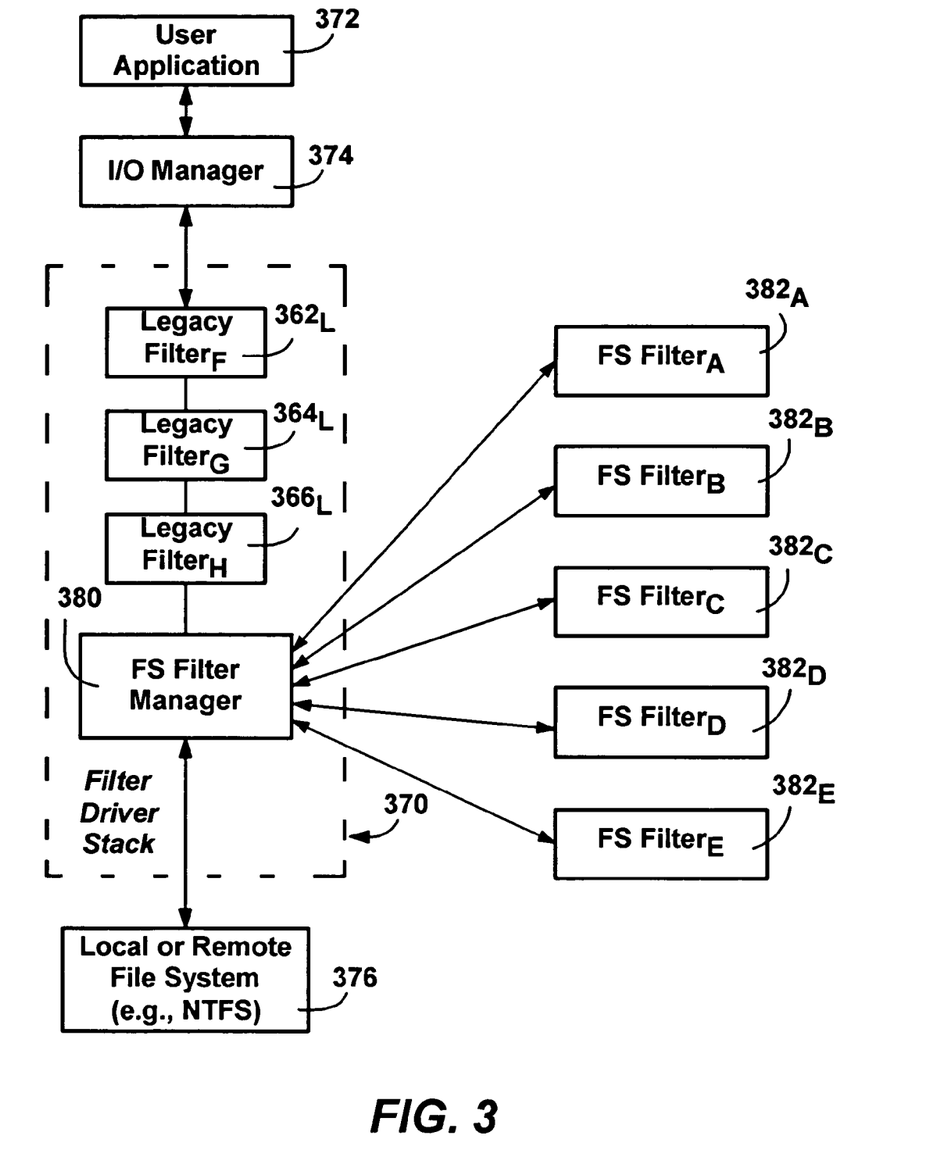
FIG. 3 is a block diagram generally representing an alternative model for ordering filter drivers in accordance with one aspect of the present invention.
Figure 4:
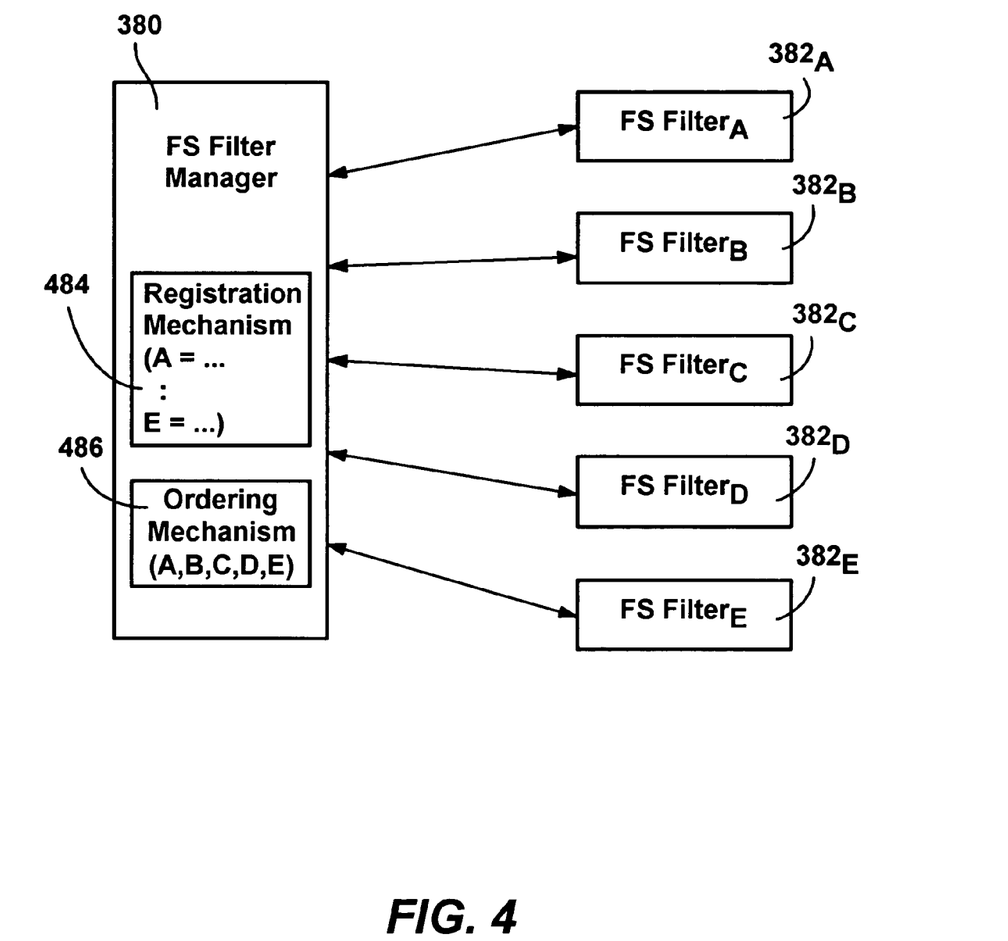
FIG. 4 is a block diagram generally representing a file system filter driver and components therein configured to arrange filter drivers for calling in order in accordance with one aspect of the present invention.

In addition to being able to arrange drivers having ordering values in a conventional filter stack configuration, the present invention is also able to provide benefits with filter drivers arranged in a new model, as generally represented in FIG. 3. In FIG. 3, legacy filter drivers are those that do not have a number assigned thereto. Such drivers are placed above the file system filter manager 380, however it is feasible to arrange them in some other order relative to other stack components. For example, an ordering mechanism such as the ordering mechanism 268 of FIG. 2 could analyze the various legacy filter drivers' attributes in an attempt to place them in some order. In any event, legacy filters may still be used in the new model.

As shown in FIG. 3, a file system filter manager 380 is employed in the new model, and placed as a driver into a filter driver stack 370, so that it can receive and process IRPs, preferably below any legacy filters $262_A$, $264_A$ and $266_A$. In general, in the filter manager model, non-legacy filter drivers $382_A$–$382_E$ are objects or the like that when instantiated, register with a registration mechanism 484 (FIG. 4) in the filter manager 380 for file system requests in which they are interested. For example, an encryption driver may register for read and write IRPs, but not for others wherein data does not have to be encrypted or decrypted. The registration mechanism 484 of the filter manager 380 may maintain this information for efficiency. Note that filters can also query for information, and/or inform the filter manager 380 of things it is not interested in.

In keeping with the present invention, the filter manager 380 passes IRPs or the like to one or more of the appropriately registered drivers $382_A$–$382_E$ in order, according to their ordering values, until no more registered drivers should get the IRP, or the IRP is failed or returned. To this end, the filter manager 380 includes an ordering mechanism 486 that tracks the order for passing the IRPs to the drivers. The filter manager 380 also analyzes the result from each driver to determine what should be done with the IRP next. Note that for IRPs traveling in the other direction (e.g., returned by the file system or by a lower driver), the filter manager 380 reverses the order it will call appropriately registered filter drivers. In this manner, the filter manager 380 internally simulates a "sub-stack" of drivers, but maintains ordering while eliminating the need to send IRPs to uninterested drivers. For efficiency, the filter manager 380 can set up or retain multiple ordered lists of drivers to call, and select an appropriate list based on the type of request.

Moreover, the filter manager 380 can install or remove drivers dynamically, i.e., without a system re-boot. To this end, the ordering mechanism 486 of the filter manager 380 inserts filter drivers into its filter driver calling order list (or lists) or removes them therefrom as required.

Figure 5:
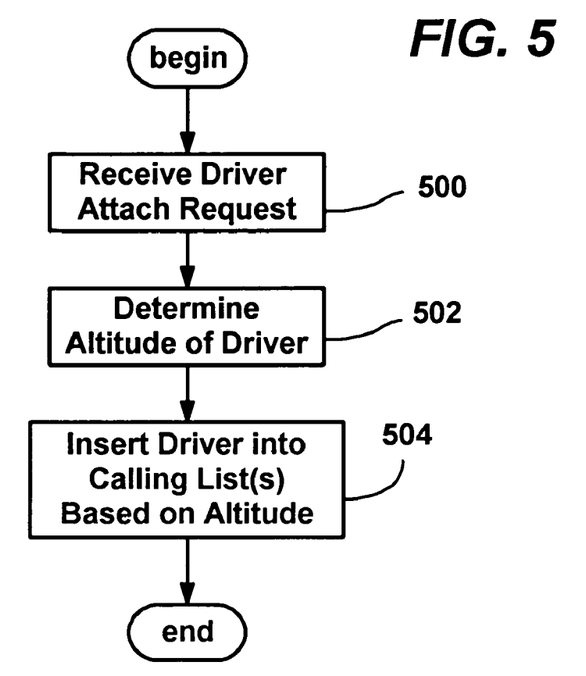
FIGS. 5 and 6 are flow diagrams generally representing a driver attaching in an attachment order, and detaching, respectively, in accordance with one aspect of the present invention.
Figure 6:
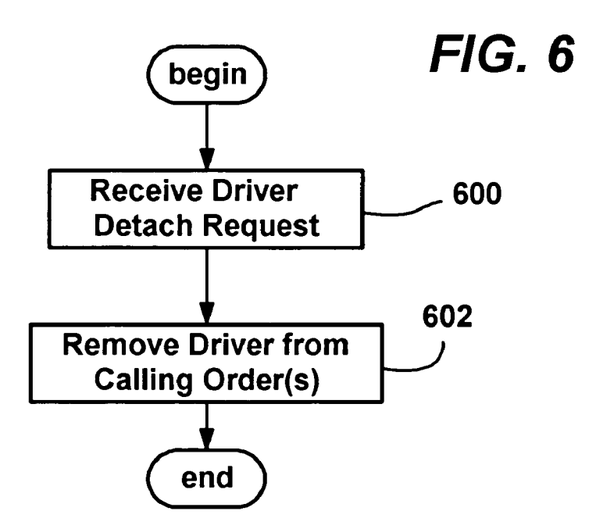

FIGS. 5 and 6 are flow diagrams that generally describe one way in which filter drivers can be dynamically attached (installed) into one or more calling-ordered lists, or dynamically detached therefrom. In general, when the filter manager is requested to install a filter driver, (at step 500, an instantiated filter driver can request installation, or the filter driver can cause instantiation of an instance of the filter driver if otherwise requested), the filter manager determines the altitude of the filter driver. Then, at step 504 the filter manager may insert the filter driver (e.g., an identifier thereof such as the object's ID) into its list or lists of registered filter drivers to call. Note that a single list may be maintained, in which event the filter driver will check the registration information of each filter driver against the type of IRP received before determining whether to call that filter driver. Alternatively, a separate list can be maintained for each type of IRP. For example, a separate list may be maintained for filter drivers only interested in read IRPS, another for those interested only in write IRPS, and so on, and that list used to determine the call order when an appropriate type of IRP is received.

FIG. 6 essentially mirrors FIG. 5, except that for detachment of a filter driver the altitude is not needed. Thus, at step 600 a request to detach the filter driver is received, and at step 602 it is removed from any list or lists maintained by the filter manager whereby the filter driver will no longer be called. Note that the filter driver object may be deallocated from memory when no longer needed.

Figure 7:
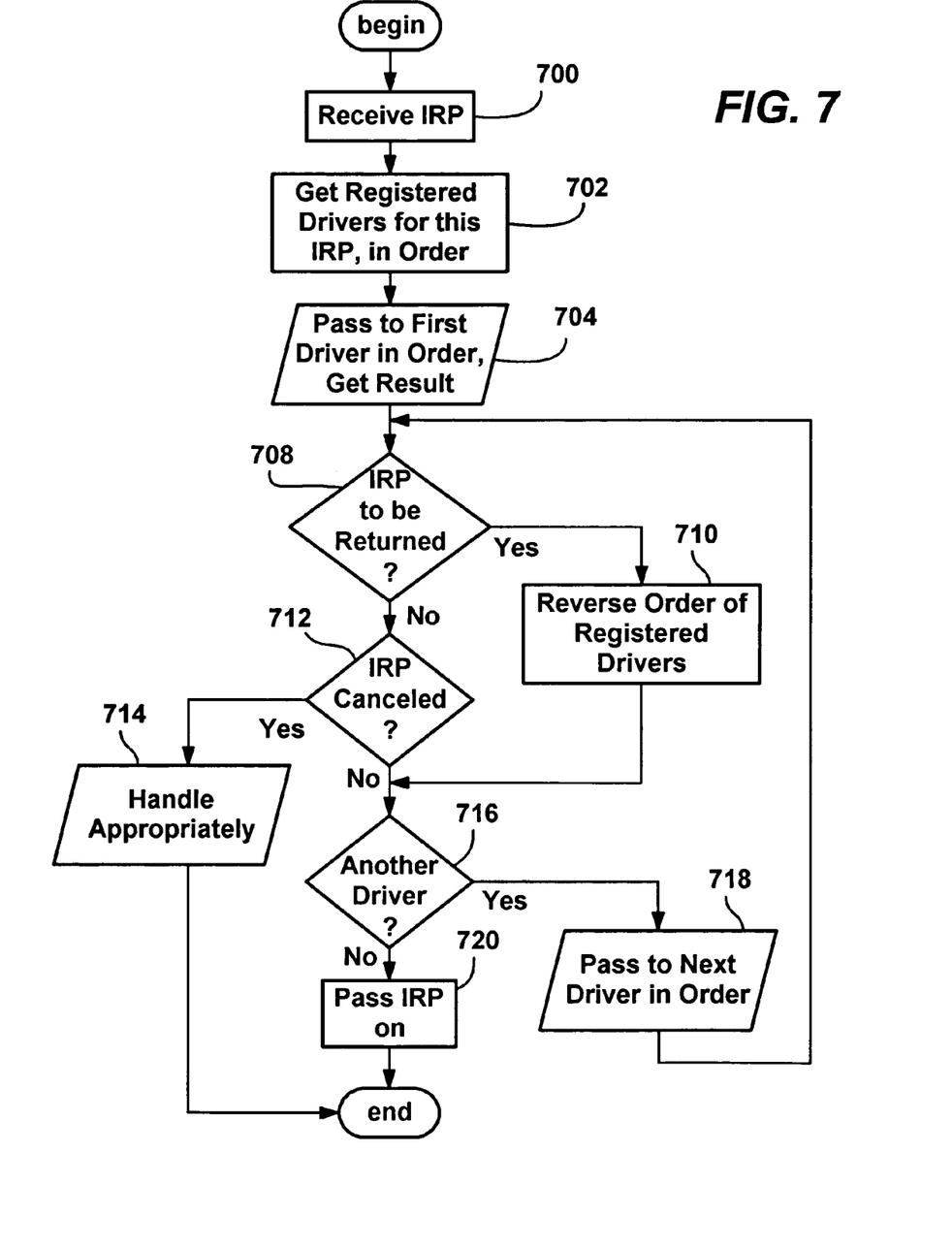
FIG. 7 is a flow diagram generally representing selective calling of appropriately registered filter drivers upon receipt of a file system request, in an attachment order in accordance with an aspect of the present invention.

FIG. 7 represents one way in which registered filter drivers may be called, in order, by the file system manager, such as upon receipt of an IRP at step 700. In FIG. 7, the exemplary file system manager at step 702 uses a list of appropriately registered filter drivers that correspond to the IRP, whether built when the IRP was received or maintained from some previous time. Notwithstanding, instead of keeping such a set of per-IRP-type lists, it is alternatively feasible to check each filter driver for a suitable type of IRP registration prior to calling that filter driver, such that filter drivers not appropriately registered for a given IRP are not passed a given IRP.

Step 704 represents the selection of the first filter driver, in order, from the list, the passing of the IRP to the first filter driver, and obtaining the result therefrom. If at step 708 the selected filter driver indicates that the IRP is to be returned, i.e., passed back up the "stack," then the filter manager essentially logically reverses the calling order at step 710, and via steps 716–718 passes the IRP in the reverse order. In the case where there are no previous IRPs, the IRP is returned via step 720 to the sender, which may be another filter driver in the actual stack or the I/O manager. Note that a time-out or similar mechanism can be employed to handle situations in which two (or more) drivers keep reversing the direction of IRPs so that the IRP would otherwise not exit the sub-stack.

There is also a possibility that an IRP will be failed by a filter driver, as represented at step 712. If so, the filter manager acts appropriately at step 714, e.g., discards the IRP, generates an error, and so forth.

If the IRP is not returned or failed by the currently selected filter driver, then the IRP is passed to the next listed filter driver in the calling order, if any. This is represented in FIG. 7 by step 718. Note that the IRP may or may not have been modified by the called filter driver. When no appropriately registered filter drivers remain, the filter driver passes the IRP on to the base file system.

Lastly, it should be noted that while the above-description was primarily directed to IRP-based I/O operation, the present invention will work with other types of I/O, including "Fast I/O."

As can be seen from the foregoing detailed description, there is provided a method and system wherein software modules are numbered in an order that determines how they execute relative to one another. The software modules can be file system filter drivers that attach or are otherwise arranged in a consistent order that depends on an assigned value. The value can be a floating point number to allow any number of drivers to be inserted between any two existing drivers. A filter manager can dynamically install filter drivers and selectively call those filter drivers for passing file system requests thereto in the consistent order.

While the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. In a computer system, a method, comprising:
   maintaining static assigned numeric values in association with software modules, each software module having a static assigned numeric value, the assigned numeric values having a relative order and there being an unassigned value between every two assigned values; and
   executing the software modules in an order determined by each of the assigned numeric values, the order being deterministic and static.

2. The method of claim 1 wherein executing the software modules comprises calling the software modules.

3. The method of claim 2 wherein the software modules comprise filter drivers, and wherein calling the software modules includes passing file system requests thereto.

4. The method of claim 3 wherein the file system requests comprise input-output request packets.

5. The method of claim 1 wherein the software modules are attached in a stack.

6. The method of claim 1 wherein executing the software modules in an order determined by each of the assigned numeric values includes maintaining an order.

7. The method of claim 1 further comprising evaluating criteria associated with the software modules, and wherein executing the software modules comprises selecting only software module that meet the criteria for execution.

8. The method of claim 7 wherein the software modules comprise filter drivers, and wherein evaluating criteria associated with the software modules comprises evaluating a file system request.

9. The method of claim 1 further comprising, assigning an assigned numeric value to a software module.

10. The method of claim 9 further comprising, classifying a software module based on a type thereof, and wherein the assigned numeric value corresponds to the type.

11. In a computer system, a mechanism comprising:
a plurality of software modules, each software module having a static assigned numeric value indicative of a relative order, there being an unassigned value between every two assigned values; and
an ordering mechanism configured to evaluate each static assigned numeric value and to arrange the software modules for execution in a relative order determined by the assigned numeric values, the order being deterministic and static.

12. The mechanism of claim 11 wherein the ordering mechanism arranges the software modules by attaching them in a stacked configuration.

13. The mechanism of claim 11 wherein the software modules comprise filter drivers.

14. The mechanism of claim 11 wherein the software modules are configured to handle input-output request packets.

15. The mechanism of claim 11 further comprising an operating system for passing file system requests to the filter drivers.

16. The mechanism of claim 11 wherein the software modules comprise filter drivers, and further comprising a filter manager, the filter manager including the ordering mechanism and further configured to call the filter drivers in the relative order determined by the assigned numeric values.

17. The mechanism of claim 16 wherein the filter manager calls the filter drivers to handle a file system request.

18. The mechanism of claim 17 wherein the filter manager is configured to evaluate criteria associated with the file system request prior to calling the filter drivers for execution in the relative order.

19. The mechanism of claim 11 wherein there is an unassigned numeric value between any two assigned values of any two software modules.

20. The mechanism of claim 11 wherein each assigned numeric value is unique to particular software modules.

21. A computer-readable storage medium having computer-executable instructions, comprising:
maintaining static assigned values in association with filter drivers, each filter driver having an assigned numeric value, the assigned values having a relative order and there being an unassigned numeric value between every two assigned numeric values; and
executing the filter drivers in an order determined by each of the assigned numeric values, the order being deterministic and static.

22. The computer-readable medium having computer-executable instructions of claim 21 wherein executing the filter drivers in an order determined by each of the assigned numeric values includes attaching the filter drivers in a stack, and passing file system requests thereto.

23. The computer-readable medium having computer-executable instructions of claim 21 wherein executing the filter drivers in an order determined by each of the assigned numeric values includes calling the filter drivers in the order determined by each of the assigned values to pass file system requests thereto.

24. A computer-implemented method, comprising: classifying software modules into groups based on types thereof;
assigning each software module a static numeric value based on its group, each assigned numeric value having a relative order that is deterministic and static and there being an unassigned numeric value between every two assigned numeric values;
maintaining an association between each software module and its assigned numeric value; and
executing at least one software module in its relative order.

25. A computer-readable storage medium having computer-executable instructions for performing the method of claim 24.

* * * * *